(12) United States Patent
Johansson

(10) Patent No.: US 7,621,978 B2
(45) Date of Patent: Nov. 24, 2009

(54) FILTER TIMER

(75) Inventor: Ronald C. Johansson, Stillwater, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 515 days.

(21) Appl. No.: 11/420,936

(22) Filed: May 30, 2006

(65) Prior Publication Data

US 2007/0277672 A1   Dec. 6, 2007

(51) Int. Cl.
*B01D 46/46* (2006.01)

(52) U.S. Cl. .................. 95/26; 55/DIG. 34; 96/419; 96/421; 96/424; 116/70; 116/112; 116/276; 116/137 R; 116/DIG. 42; 210/90; 210/138

(58) Field of Classification Search ............... 55/385.1, 55/DIG. 34; 96/419, 421, 424; 116/70, 112, 116/276, 137 R, DIG. 42; 210/90, 138; 95/26
See application file for complete search history.

(56) References Cited

U.S. PATENT DOCUMENTS

| | | | |
|---|---|---|---|
| 3,928,006 A | 12/1975 | Martineau | |
| 5,378,254 A | 1/1995 | Maly et al. | |
| 5,827,340 A | 10/1998 | Fiske | |
| 6,110,260 A * | 8/2000 | Kubokawa | 96/26 |
| 6,734,801 B2 * | 5/2004 | Scofield | 340/607 |
| 6,743,281 B1 * | 6/2004 | Miller | 96/416 |
| 6,837,922 B2 * | 1/2005 | Gorin | 96/419 |
| 6,888,466 B2 | 5/2005 | Dermody | |
| 6,979,363 B2 * | 12/2005 | Boyd et al. | 96/413 |
| 7,364,610 B2 * | 4/2008 | Falcon | 96/421 |
| 7,465,338 B2 * | 12/2008 | Kurasek | 96/25 |
| 2002/0040642 A1 | 4/2002 | Pillion et al. | |

FOREIGN PATENT DOCUMENTS

| | | |
|---|---|---|
| JP | 3-134417 | 6/1991 |
| JP | 4-94708 | 3/1992 |
| KR | 10-1999-0048551 A | 7/1999 |
| KR | 10-1999-0084486 A | 12/1999 |

* cited by examiner

*Primary Examiner*—Duane Smith
*Assistant Examiner*—Minh-Chau T Pham
(74) *Attorney, Agent, or Firm*—Trisha D. Adamson

(57) ABSTRACT

A timer that starts a time cycle when a filter is placed into a housing is disclosed. The timer cycle will not reinitiate a new time cycle when the previously used filter is removed from the housing and reinserted into the housing. In one embodiment, the filter timer assembly includes a filter having a filter media surrounded by a filter frame, a housing for supporting the filter, a piercing post connected to the housing moveable between a first resting position and a second position in direct contact with the filter frame, and a timer connected to the piercing post. The piercing post punctures a portion of the filter frame to create an opening in the filter frame. The timer initiates a count when the piercing post is actuated to the second position.

17 Claims, 4 Drawing Sheets

FILTER TIMER

BACKGROUND

The present invention relates to a filter life timer. In particular, the present invention relates to a filter life timer that initiates a cycle time upon insertion of the filter into a housing.

Air handling systems, such as air furnaces, air conditioning systems, and room air purifiers, typically include filters to take the dust and other particulate matter out of the air. When these filters become dirty the air flow through the filter is reduced. The filters therefore must be periodically changed to maintain the efficiency of the air handling system. A typical recommendation is to change a filter on a household air handling system every three months. It is often difficult for users to remember to change the filter so various methods have been developed to remind a user to change the filter.

Some filter systems include a reminder system indicating the end of the useful life of the filter. The most common type of reminder system is a timer having a switch that the user must manually actuate when a filter is changed. Various timer systems exist. Some timers have a simple switch for the user to actuate to start the timer. However, a drawback to such a system is that a user may accidentally reset the timer, which reinitiates the count. Therefore, the timer becomes ineffective for assisting in determining the proper end of the useful life of the filter. To address the problem of inadvertently resetting the timer, some systems have the timer switch recessed in a small hole. The switch is then actuated by a small thin object, like a paper clip or other specially designed tool. However, use of a separate tool is inconvenient and, therefore, the users often forget or do not reset the timer.

Instead of actuating a timer switch, another system used is to include a paper sticker attached to the filter for the user to note the date to change the filter. However, there is no reminder to the user unless the user inspects the filter and the date on the sticker. Alternatively, some systems include a dial that the user sets to count down to the filter change. As with other timer systems, the user must remember to set the dial and not inadvertently reset the dial during the countdown.

Therefore, a problem exists in timer systems for determining the end of the useful life of a filter. There is a need for an easy to use timer for determining the end of the useful life of a filter that does not require separate manual actuation by the user to initiate the time cycle.

SUMMARY

The present invention provides a timer that starts a time cycle when a filter is placed into a housing. The timer cycle will not reinitiate a new time cycle when the previously used filter is removed from the housing and reinserted into the housing.

In one embodiment, the filter life timer assembly comprises a filter comprising a filter media surrounded by a filter frame, a housing for supporting the filter, a piercing post connected to the housing moveable between a first resting position and a second position in direct contact with the filter frame, and a timer connected to the piercing post. The piercing post punctures a portion of the filter frame to create an opening in the filter frame. The timer initiates a count when the piercing post is actuated to the second position.

In another embodiment, the filter life timer assembly comprises a filter, a housing for supporting the filter, a piercing post connected to the housing, and a timer connected to the piercing post. The filter comprises a filter media surrounded by a filter frame. The filter frame includes a first portion having a first structural integrity and a second portion having a second structural integrity that is less than the first structural integrity. The piercing post is moveable between a first resting position and a second position in direct contact with the second portion of the filter frame. The piercing post punctures the second portion of the filter frame to create an opening in the filter frame. The timer initiates a count when the piercing post is actuated to the second position.

In another embodiment, a method of timing the life of a filter comprises providing a filter comprising a filter media surrounded by a filter frame, providing a piercing post connected to a housing that supports the filter, wherein the piercing post is in a first resting position, providing a timer connected to the piercing post, inserting the filter into the housing, contacting the filter frame directly with the piercing post, actuating the piercing post to a second position, initiating a count on the timer, piercing the piercing post through the filter frame to create a first opening.

While the above-identified drawings and figures set forth embodiments of the invention, other embodiments are also contemplated as noted in the discussion. In all cases, this disclosure presents the invention by way of representation and not limitation. It should be understood that numerous other modifications and embodiments can be devised by those skilled in the art, which fall within the scope and spirit of this invention. The figures may not be drawn to scale.

DETAILED DESCRIPTION

Figure 8:
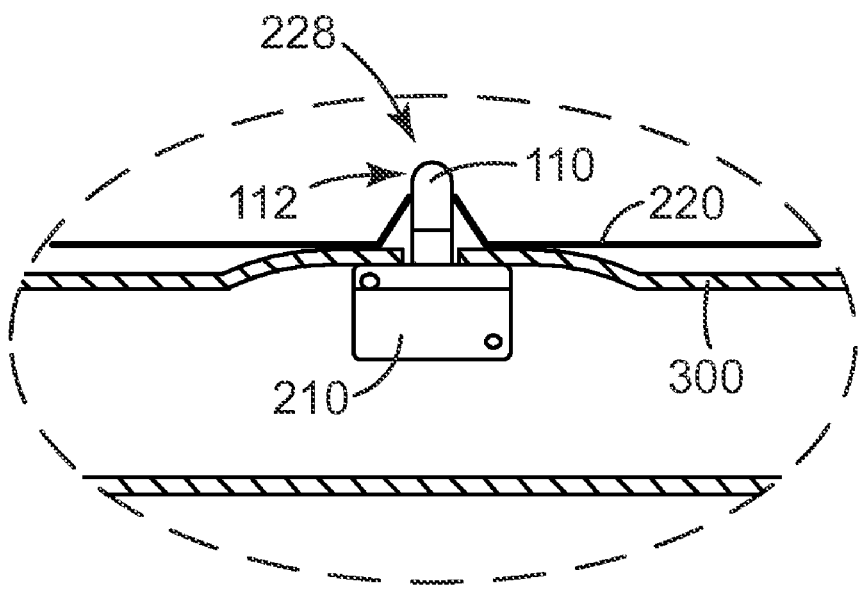
FIG. 8 is a side view of the filter life time assembly of FIG. 5 with the piercing post through the filter frame and returned to the rest position.
Figure 9:
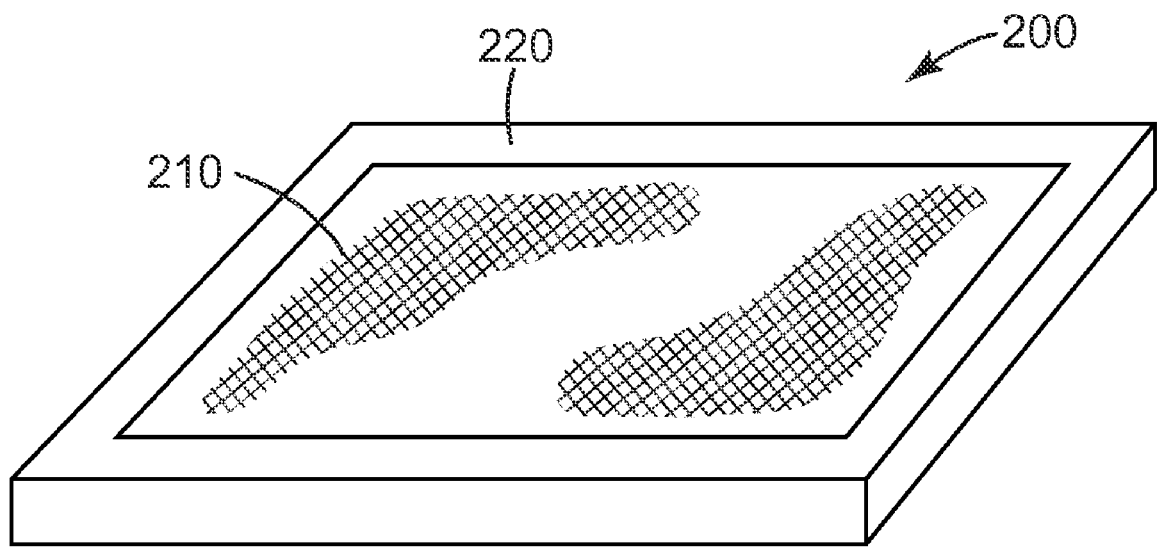
FIG. 9 is a perspective view of an embodiment of a filter.
Figure 10:
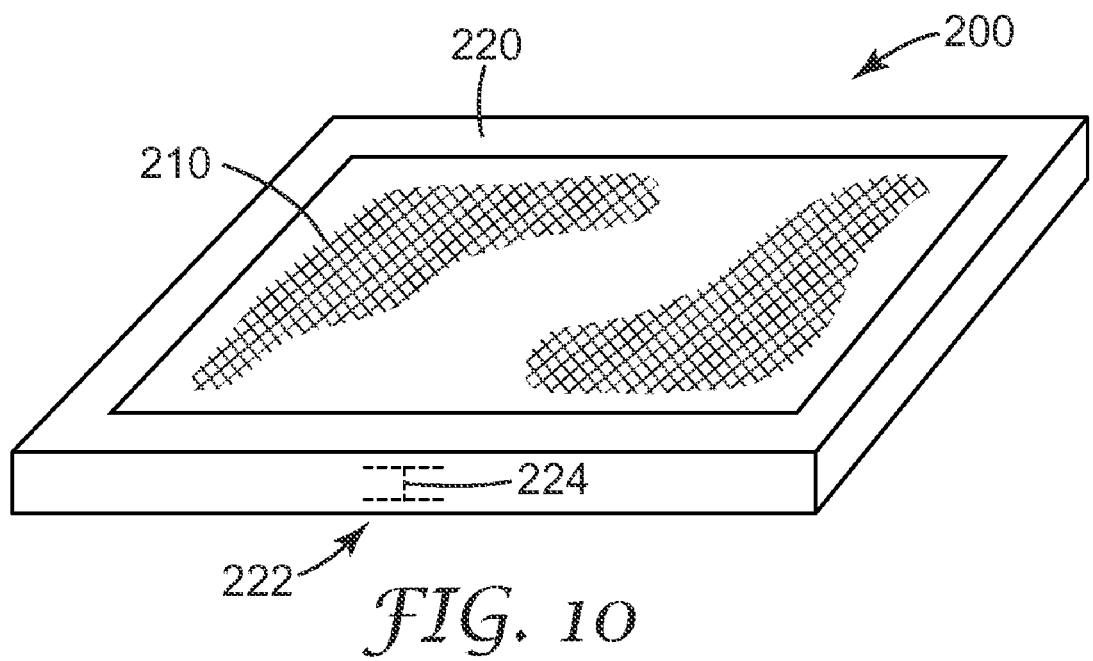
FIG. 10 is a perspective view of an embodiment of a filter including a weakened section.

The FIGS. 1-4 show a filter life timer assembly 100 in conjunction with a filter 200 such as that shown in FIG. 9 and FIGS. 5-8 show a filter life timer assembly 100 in conjunction with a filter 200 such as that shown in FIG. 10 for an air handling system, such as a furnace, air conditioner, or room air purifier. However, the filter life timer assembly 100 shown and described may be used and applied in other comparable systems where periodic changing of the filter 200 is necessary.

The filter 200 includes a filter media 210 surrounded and contained by a filter frame 220 (see generally FIG. 9). The filter media 210 may be constructed of paper; porous films of thermoplastic or thermoset materials; nonwoven, such as melt blown or spunbond, webs of synthetic or natural fibers;

scrims; woven or knitted materials; foams; electret or electrostatically charged materials; fiberglass media; or laminates or composites of two or more materials. A nonwoven polymeric web of polyolefin, polyethylene or polypropylene is suitable, for example. Filter media 210 may also include sorbents, catalysts, and/or activated carbon (granules, fibers, fabric, and molded shapes). Electret filter webs can be formed of the split fibrillated charged fibers as described in U.S. Pat. No. RE 30,782. These charged fibers can be formed into a nonwoven web by conventional means and optionally joined to a supporting scrim such as disclosed in U.S. Pat. No. 5,230,800 forming an outer support layer. Alternatively, filter media 210 can be a melt blown microfiber nomwoven web, such as disclosed in U.S. Pat. No. 4,813,948 which can be joined to a support layer during web formation as disclosed in that patent, or subsequently joined to a support web in any conventional manner.

The filter frame 220 generally entirely surrounds the filter media 210. The filter frame 220 may be constructed of paper, chipboard, cardboard, paperboard, boxboard, film, metal or plastic. As will be described in detail below with respect to FIGS. 10 and 11, the filter frame 220 may optionally include a portion having a weakened section 222.

The filter 200 is inserted into a housing 300. Depending on the air handling system, the housing 300 may be a portion of a furnace, an air conditioner, or a room air purifier. Attached to the housing 300 is the filter life timer assembly 100 for initiating a timer count. The filter life timer assembly 100 includes a piercing post 110 and a timer body 120.

The piercing post 110 may have a blunt, rounded, or pointed tip in aiding to pierce through the frame 220 of the filter 200. As will be shown and described below, FIGS. 1-4 show the operation of a pointed tip piercing post 110 with a filter as shown in FIG. 9. FIGS. 5-8 show the operation of a rounded tip piercing post 110 with a filter as shown in FIG. 10.

The piercing post 110 may be made of any durable material such as metal or plastic. Generally the piercing post 110 is rounded but can have a cross-section of any shape. The desired size of the cross-section will depend of the size of the filter that the piercing post 110 interacts and the material and thickness of the filter frame 220. In one embodiment, the diameter (length dimension if nor circular) generally ranges from 0.100 to 0.250 inches (2.54 mm to 6.35 mm), for interaction with a filter having a width of one inch (2.54 cm) made of chipboard 0.026 inches (0.66 mm) thick.

The filter life tinier assembly 100 may be just a switch that is connected to external electronics (not shown). Alternatively, within the timer body 120 may be the circuitry and programming for the timer. Regardless, a preset time will be set and when the preset time is reached by the timer count, a signal is sent to the user to change the filter 200. The preset time may be a standard preset amount of, for example, 3 months, or may be individually set by the user so that the particular conditions of the air quality (pet hair, excess dust) may be considered. Alternatively, the timer may only count the actual hours of use of the fan or blower of the air handling system. An output reading of the timer may be contained within the timer body 120 or may be positioned for viewing by a user. Optionally, the filter life timer assembly 100 may include an alarm (not shown) that signals a visual or audio transmission to a user that the timer has reached the preset time and therefore a new filter is needed. In one embodiment, a percentage used output is transmitted and is available for viewing by the user. In another embodiment, a red, yellow, or green light may be indicated, the colors corresponding to a percentage of the filter used and the need for the user to replace the filter.

Figure 1:
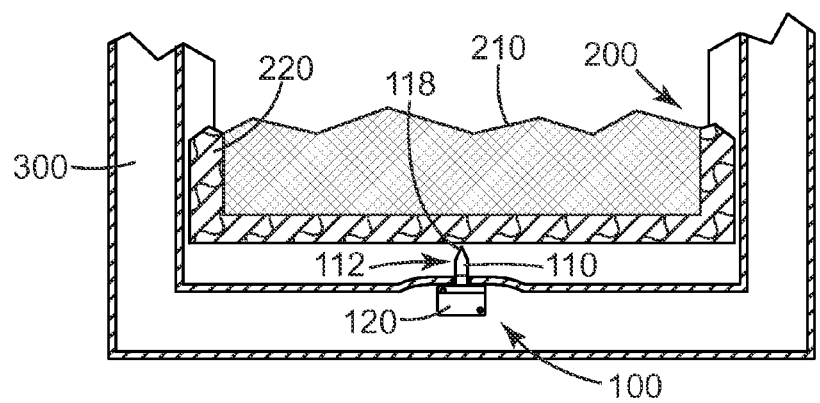
FIG. 1 is a side view of an embodiment of the filter life timer assembly with the piercing post in a rest position.
Figure 2:
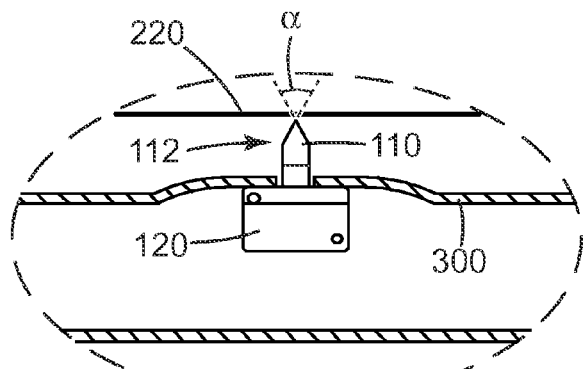
FIG. 2 is an enlarged view of FIG. 1.

FIG. 1 is a side view of the filter life timer assembly 100 with the piercing post 110 in a rest position 112. FIG. 2 is an enlarged view of FIG. 1. As shown in FIGS. 1 and 2, the filter 200 is being inserted into the housing 300. Also, the filter 200 has not made contact with the piercing post 110 of the filter life timer assembly 100. Therefore, the piercing post 110 is in a rest position 112.

The filter 200 shown in FIGS. 1-4 is generally represented by the filter shown in FIG. 9 and does not have a weakened section in the frame 220. To assist in puncturing the filter frame 220, the piercing post 110 included in the embodiment depicted in FIGS. 1-4 includes a pointed tip 118.

The pointed tip 118 may be generally cone shaped or may comprise two or more planes meeting at the tip (intersection of the planes). For either case, at a cross section of the tip (such as that shown by the side view of piercing post shown in FIGS. 1 and 2) an angle at is formed. In one embodiment, the angle $\alpha$ ranges from 40 to 100 degrees.

Figure 3:
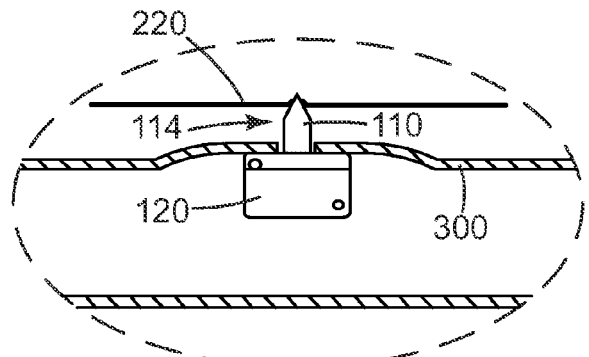
FIG. 3 is a side view of the filter life timer assembly of FIG. 1 with the piercing post in a second position.

FIG. 3 is a side view of the filter life timer assembly 100 of FIG. 1 with the filter frame 220 in direct contact with the piercing post 110. The filter frame 220 has engaged with the piercing post 110 enough to move the piercing post 110 to a second position 114. The piercing post 110 may only be depressed a certain amount, which is identified as the second position 114, and then further depression is prevented. As can be seen in FIG. 3, the filter frame 220 is not completely inserted within the housing 300. However, the piercing post remains in the second position 114 and the pointed tip 118 of the piercing post 110 begins to damage, deform, and puncture the frame 220 of the filter 200.

When in the second position 114, the filter life timer assembly 100 initiates a Count. It is understood that the filter life timer assembly 100 at a minimum is a switch that communicates with electronics and programming, which may or may not be contained within the filter life timer assembly 100. The count may be a count up from zero to a preset time or a count down from a preset time to zero.

Figure 4:
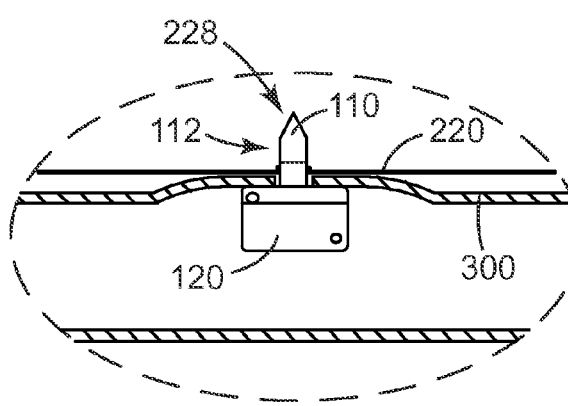
FIG. 4 is a side view of the filter life timer assembly of FIG. 1 with the piercing post through the filter frame and returned to the rest position.

FIG. 4 is a side view of the filter timer assembly 100 with the piercing post 110 through the filter frame 220 and returned to the rest position 112. When no force is acting on the piercing post 110, the piercing post 110 returns to the rest position 112. Therefore, once the opening 228 in the frame 220 has been created, the piercing post 111) will automatically return to the rest position 112.

Two examples of piercing posts 100 including a pointed tip that function well with a 3M Filtrete® Air Purifier Filter (15.2 in.×8.9 in.×0.8 in.) (38.6 cm×22.6 cm×2.03 cm) were a 0.150 inch (3.81 mm) diameter piercing post with point at an angle $\alpha$ of 60 degrees and a 0.100 inch (2.54 mm) diameter piercing post with a point at an angle $\alpha$ of 80 degrees.

These sizes were able to puncture sizable openings 228 in the filter frame 220 and when the filter was reinserted, did not reinitiate a count of the timer.

Figure 5:
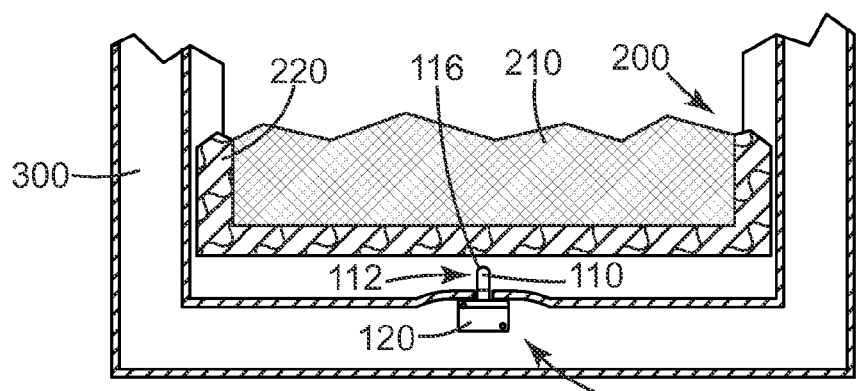
FIG. 5 is a side view of a second embodiment of the filter life timer assembly with the piercing post in a rest position.
Figure 6:
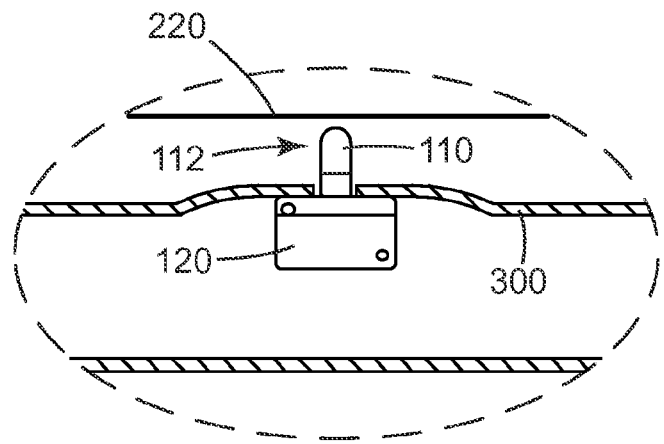
FIG. 6 is an enlarged view of FIG. 5.

FIG. 5 is a side view of the filter life timer assembly 100 with the piercing post 110 in a rest position 112. FIG. 6 is an enlarged view of FIG. 5. As shown in FIGS. 5 and 6, the filter 200 is being inserted into the housing 300. Also, the filter 200 has not made contact with the piercing post 110 of the filter life timer assembly 100. Therefore, the piercing post 110 is in a rest position 112.

The filter 200 shown in FIGS. 5-8 includes a weakened section 222, which is generally represented by the filter shown in FIG. 10. The weakened section 222 assists the piercing post 110 in puncturing the filter frame 220. The piercing post 110 included in the embodiment depicted in FIGS. 5-8 includes a rounded tip 116.

Figure 7:
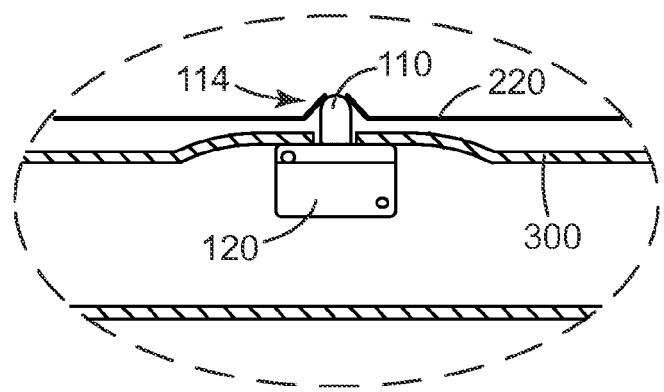
FIG. 7 is a side view of the filter life timer assembly of FIG. 5 with the piercing post in a second position.

FIG. 7 is a side view of the filter life timer assembly 100 with the filter frame 220 in direct contact with the piercing post 110. The filter frame 220 has engaged with the piercing post 110 enough to move the piercing post 110 to a second position 114. The piercing post 110 may only be depressed a certain amount, which is identified as the second position 114, and then further depression is prevented. As the filter 200 continues to be inserted within the housing 300, the piercing post remains in the second position 114 and begins to damage, deform, and puncture the frame 220 at the weakened section 222 of the filter 200 and separation along the perforations 224 (see FIG. 10) begins.

When in the second position 114, the filter life timer assembly 100 initiates a count. It is understood that the filter life timer assembly 100 at a minimum is a switch that communicates with electronics and programming, which may or may not be contained within the filter life timer assembly 100. The count may be a count up from zero to a preset time or a count down from a preset time to zero.

FIG. 8 is a side view of the filter life time assembly 100 with the piercing post 110 through the filter frame 220 and returned to the rest position 112. When no force is acting on the piercing post 110, the piercing post 110 returns to the rest position 112. Therefore, once the opening 228 in the frame 220 has been created, the piercing post 110 will automatically return to the rest position 112. The perforations 224 of the weakened section 222 have entirely broken to create the opening 228. Because the perforations 224 where generally in an H shape (see FIG. 10) the side walls of the H are abutting and adjacent the piercing post 110.

Once a filter 200 has been inserted into the housing 300 and an opening 228 has been created in the frame 220, the filter 200 may be removed from the housing 300. Then, if the same filter 200 is reinserted into the housing 300, in the same direction, the opening 228 will coincide with the piercing post 110. In such an instance, because the piercing post 110 is not reactuated to the second position 114, a new time cycle is not initiated. Therefore, the time cycle will continue for the already partially used filter.

The direction the filter 200 is inserted in to the housing 300 is important for properly aligning the opening 228 created in the filter frame 220 with the piercing post 110 and therefore preventing the reactuation of the piercing post 110 (for an already punctured filter frame 220). Therefore, printing or other indicia may be placed on the filter frame 220 indicating an up or down direction and a front or back direction, with respect to the air flow path. The filter 200 may also be designed to be asymmetrical or a keyway may be included so that the filter 100 can only be placed in the housing 300 in one direction. Additionally, two piercing posts 110 positioned 90 degrees, with respect to the piercing posts 110 shown in the embodiments of FIGS. 1-8 maybe included to eliminate the need for an additional up/down direction indication to the user.

FIG. 9 is a perspective view of an embodiment of a filter 200 including a filter frame 220 surrounding a filter media. The filter 200 of FIG. 9 does not contain a weakened section 222 as is described with respect to FIGS. 10 and 11. The filter 200 of FIG. 9 without the weakened section is shown and described with respect to FIGS. 1-4 where the piercing post 110 directly punctures the filter frame 220. In such an embodiment, the filter 200 typically is constructed of paper, chipboard or other readily punctureable or deformable material.

Figure 11:
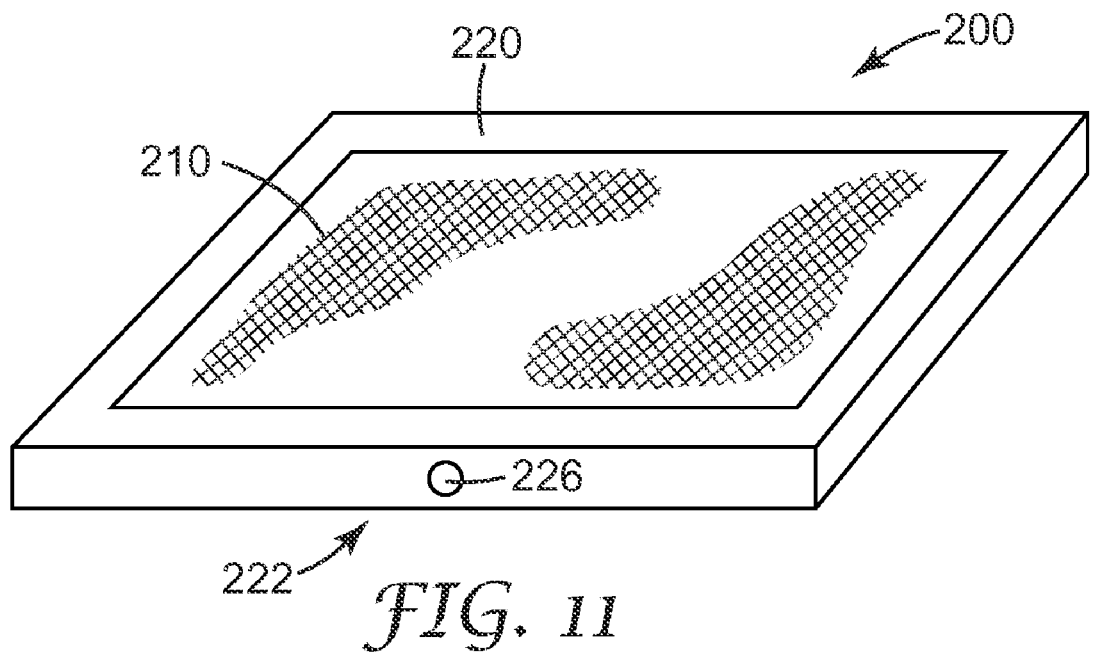
FIG. 11 is a perspective view of a second embodiment of a filter including a weakened section.

FIGS. 10 and 11 are perspective views of an embodiment of a filter 200 including a weakened section 222. In FIG. 10, the weakened section is a perforated structure 224 in the frame 220. A perforated structure 224 is particularly suited for a chipboard or other paper-like frame 220. The perforated structure 224 shown is in the shape of an "H." The H will open and form flaps when contacted by the piercing post 110. Additionally, the perforated structure 224 may be any shape including a square, rectangle, oval, circle, triangle or the like, which will "punch-out" or "hinge-out" when contacted by the piercing post or other structure that will fold back to form flaps.

In FIG. 11, the weakened section 222 is a punctureable membrane 226 that the piercing post 110 contacts and pierces through. The punctureable membrane 226 may be of any material such as paper, chipboard, cardboard, film, plastic, or metal. In one embodiment, the punctureable membrane 226 has a structural integrity that is less than the structural integrity of the remaining portion of the frame 220. As shown, the punctureable membrane 226 is in the shape of a circle. However, the punctureable membrane 226 may be in any size or shape.

Other types of weakened sections 222 are within the scope of the presented invention so long as the weakened section provides an area having a structural integrity that is less than the structural integrity of the remaining portion of the filter frame 220. The particular choice of weakened section, if provided, depends on the material of the filter frame 220. For example, if the filter frame 220 is paper, or chipboard, a perforated structure may be particularly desirable.

Disclosed is a filter life timer for providing reminder to a user of when to change a filter. It may be desirable to incorporate into the air handling system other types of sensors that actually measure the airflow through the filter or pressure drop across the filter so that a determination of that actual level of life remaining in the filter can be measured. An example of a suitable filter life sensor systems is disclosed in U.S. patent application Ser. No. 11/420,949 titled "PIEZO-ELECTIRIC FILTER SENSOR", filed on even date.

Although specific embodiments of this invention have been shown and described herein, it is understood that these embodiments are merely illustrative of the many possible specific arrangements that can be devised in application of the principles of the invention. Numerous and varied other arrangements can be devised in accordance with these principles by those of ordinary skill in the art without departing from the spirit and scope of the invention. Thus, the scope of the present invention should not be limited to the structures described in this application, but only by the structures described by the language of the claims and the equivalents of those structures.

What is claimed is:

1. A filter timer assembly comprising:

a filter comprising a filter media surrounded by a filter frame;

a housing for supporting the filter;

a piercing post connected to the housing moveable between a first resting position and a second position in direct contact with the filter frame, wherein the piercing post punctures a portion of the filter frame to create an opening in the filter frame;

a timer connected to the piercing post;

wherein the timer initiates a count when the piercing post is actuated from the first resting position to the second position and wherein the piercing post returns to the first resting position following puncture of the portion of the filter frame, whereby the timer maintains the count until the piercing post is returned to the second position.

2. The filter timer assembly of claim 1, wherein the filter frame comprises a weakened portion that the piercing post punctures to create an opening in the filter frame.

3. The filter timer assembly of claim 2, wherein the weakened portion includes a perforation in the filter frame.

4. The filter timer assembly of claim 1, wherein the piercing post comprises a pointed tip for puncturing the filter frame.

5. The filter timer assembly of claim 1, wherein the count of the timer coincides with operation of a fan within the housing.

6. The filter timer assembly of claim 1, wherein the timer includes a predetermined time.

7. The filter timer assembly of claim 6, wherein an alarm is signaled when the count reaches the predetermined time.

8. A filter timer assembly comprising:
   a filter comprising a filter media surrounded by a filter frame, wherein the filter frame includes a first portion having a first structural integrity and a second portion having a second structural integrity that is less than the first structural integrity;
   a housing for supporting the filter;
   a piercing post connected to the housing moveable between a first resting position and a second position in direct contact with the second portion of the filter frame, wherein the piercing post punctures the second portion of the filter frame to create an opening in the filter frame;
   a timer connected to the piercing post;
   wherein the timer initiates a count when the piercing post is actuated from the first position to the second position and wherein the piercing post returns to the first resting position following puncture of the portion of the filter frame, whereby the timer maintains the count until the piercing post is returned to the second position.

9. The filter timer assembly of claim 8, wherein the second portion comprises a perforation in the filter frame.

10. The filter timer assembly of claim 8, wherein the piercing post comprises a rounded tip for puncturing the second portion of the filter frame.

11. The filter timer assembly of claim 8, wherein the timer includes a predetermined time.

12. The filter timer of claim 11, wherein an alarm is signaled when the count reaches the predetermined time.

13. A method of timing the life of a filter comprising:
   providing a filter comprising a filter media surrounded by a filter frame;
   providing a piercing post connected to a housing that supports the filter, wherein the piercing post is in a first resting position;
   providing a timer connected to the piercing post;
   inserting the filter into the housing;
   contacting the filter frame directly with the piercing post;
   actuating the piercing post to a second position;
   initiating a count on the timer;
   piercing the piercing post through the filter frame to create a first opening;
   actuating the piercing post through the first opening;
   returning the piercing position to the first resting position;
   maintaining the count until the piercing post is returned to the second position.

14. The method of claim 13, further comprising:
   removing the filter from the housing.

15. The method of claim 14, further comprising:
   reinserting the filter into the housing;
   positioning the piercing post through the first opening;
   maintaining the count on the timer.

16. The method of claim 14, further comprising:
   inserting a second filter comprising a second filter media surrounded by a second filter frame into the housing;
   contacting the second filter frame directly with the piercing post;
   actuating the piercing post to the second position;
   initiating a second count on the timer.

17. The method of claim 13, further comprising:
   presetting a predetermined time in the timer;
   signaling an alarm when the count reaches the predetermined time.

* * * * *

UNITED STATES PATENT AND TRADEMARK OFFICE
CERTIFICATE OF CORRECTION

PATENT NO. : 7,621,978 B2
APPLICATION NO. : 11/420936
DATED : November 24, 2009
INVENTOR(S) : Ronald C. Johansson It is certified that error appears in the above-identified patent and that said Letters Patent is hereby corrected as shown below:

Column 1

Line 63; delete "tinier" and insert -- timer --, therefor.

Column 2

Line 24; delete "FIG. 1.;" and insert -- FIG. 1; --, therefor.

Line 32; delete "FIG. 5." and insert -- FIG. 5; --, therefor.

Line 38; delete "filter." and insert -- filter; --, therefor.

Line 45; delete "contemplated" and insert -- contemplated, --, therefor.

Column 3

Line 13; delete "nomwoven" and insert -- nonwoven --, therefor.

Line 46; delete "tinier" and insert -- timer --, therefor.

Column 4

Line 17; delete "at" and insert -- $\alpha$ --, therefor.

Line 32; delete "Count." and insert -- count. --, therefor.

Line 43; delete "111)" and insert -- 110 --, therefor.

Line 51-53; delete "These sizes were able to puncture sizable openings 228 in the filter frame 220 and when the filter was reinserted, did not reinitiate a count of the timer." and insert the same after "80 degrees." on Col. 4, Line 50, as a continuation of the same paragraph.

Column 5

Line 49; delete "100" and insert -- 200 --, therefor.

CERTIFICATE OF CORRECTION (continued)
U.S. Pat. No. 7,621,978 B2

Column 6

Line 35-36; delete ""PIEZOELECTIRIC" and insert -- "PIEZOELECTRIC --, therefor.

Line 36; after "SENSOR", insert -- (docket 62096US002), --.

Signed and Sealed this

Twenty-third Day of March, 2010

David J. Kappos
*Director of the United States Patent and Trademark Office*

UNITED STATES PATENT AND TRADEMARK OFFICE
CERTIFICATE OF CORRECTION

PATENT NO.      : 7,621,978 B2                              Page 1 of 1
APPLICATION NO. : 11/420936
DATED           : November 24, 2009
INVENTOR(S)     : Ronald C. Johansson It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 693 days.

Signed and Sealed this

Twenty-sixth Day of October, 2010

David J. Kappos
*Director of the United States Patent and Trademark Office*